United States Patent
Bazzo et al.

(10) Patent No.: US 6,832,909 B2
(45) Date of Patent: Dec. 21, 2004

(54) INJECTION NOZZLE FOR PLASTIC INJECTION MOULDING EQUIPMENT

(75) Inventors: Maurizio Bazzo, Ormelle (IT); Nico Trevisiol, Maserada sul Piave (IT)

(73) Assignee: Incos S.p.A., San Polo di Piave (IT)

(*) Notice: Subject to any disclaimer, the term of this patent is extended or adjusted under 35 U.S.C. 154(b) by 174 days.

(21) Appl. No.: 10/323,318

(22) Filed: Dec. 18, 2002

(65) Prior Publication Data

US 2003/0118688 A1 Jun. 26, 2003

(30) Foreign Application Priority Data

Dec. 21, 2001 (IT) ..................................... TO2001A1214

(51) Int. Cl.⁷ ............................................... B29C 45/23
(52) U.S. Cl. ................ 425/549; 264/328.9; 264/328.15; 425/564; 425/566
(58) Field of Search ................................. 425/549, 562, 425/563, 564, 565, 566; 264/328.9, 328.15

(56) References Cited

U.S. PATENT DOCUMENTS

| | | | |
|---|---|---|---|
| 5,492,467 A | 2/1996 | Hume et al. | 425/549 |
| 5,674,439 A * | 10/1997 | Hume et al. | 425/549 |
| 5,879,727 A * | 3/1999 | Puri | 425/549 |
| 6,302,680 B1 | 10/2001 | Gellert et al. | 425/549 |
| 6,769,901 B2 * | 8/2004 | Babin et al. | 425/549 |

FOREIGN PATENT DOCUMENTS

| | | |
|---|---|---|
| EP | 0633118 A1 | 6/1994 |
| EP | 0854027 A1 | 7/1998 |
| WO | WO 01/28750 A1 | 4/2001 |

* cited by examiner

*Primary Examiner*—Tim Heitbrink
(74) *Attorney, Agent, or Firm*—Heslin Rothenberg Farley & Mesiti P.C.; Victor A. Cardona, Esq.

(57) ABSTRACT

An injection nozzle for plastic injection moulding equipment having a nozzle tip (4) with an internal hollow element (5) made of a material with high thermal conductivity, and an external hollow element (6) made of a material with a lower thermal conductivity. The internal hollow element (5) is connected to the body (1) of the injector nozzle independently with respect to the external hollow element (6), and a space of mutual separation (19) is defined between the internal and external hollow elements (5, 6).

10 Claims, 1 Drawing Sheet

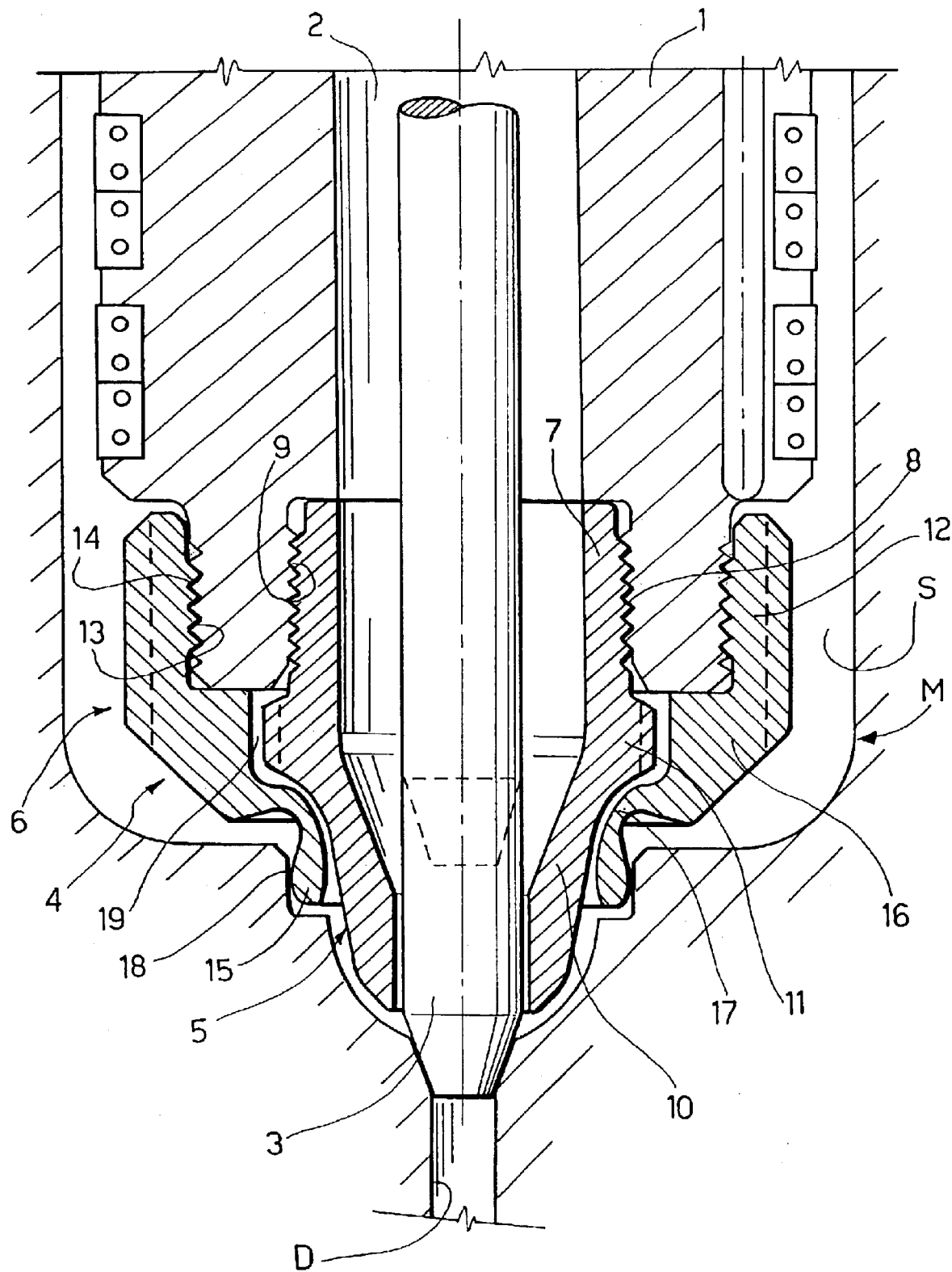

INJECTION NOZZLE FOR PLASTIC INJECTION MOULDING EQUIPMENT

FIELD OF THE INVENTION

The present invention relates to plastic injection moulding equipment in general and, more in particular, an injection nozzle for such equipment, of the type comprising a body with a central passageway and a nozzle tip including an internal hollow element made of a material with high thermal conductivity and an external hollow element made of a material with a lower thermal conductivity.

STATE OF THE PRIOR ART

An injection nozzle of this type is described and illustrated, for example, in European Patent EP-B-0633118 in the name of GELLERT, according to which the external hollow element presents a thread at one end that can engage with a corresponding thread on the injector body and, at the other end, a part providing sealed contact with the injection mould to which the injector is operatively associated. The internal hollow element is placed between the said central passageway and the external hollow element.

In the injector nozzle described in EP-B-0633118, the internal hollow element is locked and restrained relative to the body of the injector nozzle by the same external hollow element itself, which thus functions as an axial stop device for the internal hollow element. With this device, the external hollow element is in direct contact with the internal hollow element along wide areas of its surface, with the consequent transmission of a significant amount of heat due to conduction. Heat is thus transmitted from the internal hollow element, through the sealed contact part between the external hollow element and the injection mould to which the injection nozzle is applied, to the mould itself, which constitutes an undesired effect. Instead, it is desirable to reduce such heat transmission as much as possible for the efficiency of the injection moulding process.

SUMMARY OF THE INVENTION

In order to achieve this object, the subject of the invention is an injection nozzle of the type defined at the beginning, the essential characteristic of which resides in the fact that the internal hollow element is connected to the body of the injector independently of the external hollow element, and in the fact that a space of mutual separation is defined between the said external hollow element and the said internal hollow element.

The space of mutual separation provides an air gap, due to which there is no direct contact between the internal hollow element and the external hollow element and hence the transmission of heat from the injection nozzle to the mould is considerably reduced.

In accordance with a preferred form of embodiment of the invention, the internal hollow element is provided with a thread that engages with a corresponding thread on the body of the injector. In addition, the contact part of the external hollow element, which can beneficially be elastically sprung, has advantageously a substantially spherical surface and, between this contact part and the remainder of the external hollow element, a reduced-section annular part, which also contributes to reducing the transmission of heat to mould, can be provided to advantage.

BRIEF DESCRIPTION OF THE DRAWING

Further characteristics and advantages of the invention will become evident in the course of the detailed description that follows, with reference to the enclosed drawing, provided purely by way of a non-limitative example, which illustrates, in partial longitudinal section and in enlarged scale, the terminal part of an injection nozzle in accordance with the invention for plastic injection moulding equipment.

DETAILED DESCRIPTION OF THE INVENTION

The injection nozzle represented in the drawing is, taken as a whole, of the generally known type and will therefore not be discussed in detail. For the purposes of the invention, it is sufficient to explain that this injector nozzle, corresponding to that described and illustrated in European patent application n° 01830680.3 in the name of A.S. (unpublished at the priority date of this application) for example, is inserted through the space S of a mould M for plastic injection, the cavity of which communicates with the space S through an injection duct D. The injection nozzle presents a body 1 with a central axial passageway 2 for the plastic material to be injected, aligned with the injection duct D and inside which a plug 3 can move axially, cooperating with the injection duct D as a shutter.

On the part of the injection nozzle 1 facing the injection duct D of the mould M, there is a nozzle tip 4 formed by an internal hollow element 5 made of a material with high thermal conductivity (typically copper) and an external hollow element 6 made of a material with a lower thermal conductivity, such as steel or titanium for example.

In accordance with a fundamental characteristic of the invention, the internal hollow element 5 and the external hollow element 6 are fixed to the body 1 of the injector nozzle separately and independently of each other, without any mutually direct contact.

More in detail, the internal hollow element 5 presents an axially internal portion 7 with an external thread 8 screwed into a corresponding thread 9 on the body 1 of the injector nozzle, and an axially external portion 10 that extends beyond the external hollow element 6 and through which the free end of the plug 3 moves. The internal hollow element 5 presents a thicker intermediate portion 11 between the axial portions 7 and 10, and the external surface of the axial portion 10 is conveniently curved.

In turn, the external hollow element 6 presents an axially internal portion 12 with an internal thread 13 screwed onto a corresponding external thread 14 on the body 1 of the injector nozzle, and an axially external portion 15. The external hollow element 6 has an intermediate portion of greater thickness 16 between the axially internal portion 12 and axially external portion 15, and the axially external portion 15 connects to the intermediate portion 16 via a flattened portion 17.

The axially external portion 15 can be beneficially made to be elastically sprung, such as in the case where the external hollow element 6 is made from spring steel for example, and presents a generally spherical external surface 18, in substantially linear peripheral contact with the mould M. This ensures an efficient hermetic contact seal without the need for resorting to excessive machining tolerances.

As is clearly visible in the figure, there is no contact between the internal hollow element 5 and the external hollow element 6, and between the axially external 10 and intermediate 11 portions of the former on one side and the axially external 15 and intermediate 16 portions of the latter on the other, an annular air space 19 is defined, constituting a thermal insulation air space.

The above-described arrangement reduces the transfer of heat from the internal hollow element 10, or rather from the plastic material being injected when it flows through the central passageway 2 of the injector nozzle 1, and the external hollow element 16, or rather the mould M.

Experimental tests conducted by the applicant have demonstrated that with this arrangement, the temperature of the mould M in the zone of the contact surface 18 of the external annular element 6 is appreciably lower than in the case where conventional injector nozzles are used, where the internal and external hollow elements of the relative nozzle tip are arranged in mutual contact.

Naturally, the constructional details and forms of embodiment could be extensively changed with respect to that described and illustrated without leaving the scope of this invention, as is defined in the following claims.

What is claimed is:

1. An injection nozzle for plastic injection moulding equipment, including a body (1) with a central passageway (2) and a nozzle tip (4) including an internal hollow element (5) made of a material with high thermal conductivity and an external hollow element (6) made of a material with a lower thermal conductivity, wherein one end (12) of the said external hollow element (6) has a thread (13) that can engage with a corresponding thread (14) on the body (1) of the injection nozzle and, at an opposed end of said hollow element there is (15), a part providing sealed contact (18) with the injection mould (M), and wherein the internal hollow element (5) is positioned between the said central passageway (2) and the said external hollow element (6), said internal hollow element (5) being connected to said body (1) of the injection nozzle independently with respect to the said external hollow element (6), and a space of mutual separation (19) being defined between the said external hollow element and (6) the said internal hollow element (5).

2. An injection nozzle according to claim 1, wherein said internal hollow element (5) is provided with a thread (8) which engages with a corresponding thread (9) on the body (1) of the injection nozzle.

3. An injection nozzle according to claim 2, wherein said thread (13) of said external hollow element (6) is an internal thread and that the corresponding thread (14) on said body (1) is an external thread, while the said thread (8) of the internal hollow element (5) is an external thread and corresponding thread (9) on said body (1) is an internal thread.

4. An injection nozzle according to claim 1, wherein a reduced-section annular part (17) is provided between the said contact part (18) of the external hollow element (6) and the remainder (12 and 16) of the said external hollow element (6).

5. An injection nozzle according to claim 1, wherein said contact part (18) of said external hollow element (6) has a substantially spherical surface.

6. An injection nozzle according claim 1, wherein said contact part (18) of the external hollow element (6) is elastically sprung.

7. An injection nozzle according to claim 1, wherein said external hollow element (6) is made of steel.

8. An injection nozzle according to claim 1, wherein the said external hollow element (6) is made of titanium.

9. An injection nozzle according to claim 1, wherein said internal hollow element (5) and the said external hollow element (6) have respective, enlarged intermediate portions (11, 16).

10. An injection nozzle according to claim 1, wherein said internal hollow element (5) and said external hollow element (6) have respective, curved surfaces that delimit, at least partially, said space of mutual separation (19).

* * * * *

UNITED STATES PATENT AND TRADEMARK OFFICE
CERTIFICATE OF CORRECTION

PATENT NO. : 6,832,909 B2
DATED : December 21, 2004
INVENTOR(S) : Bazzo et al.

It is certified that error appears in the above-identified patent and that said Letters Patent is hereby corrected as shown below:

Column 3,
Lines 24 and 25, delete "(15)" after "is" in line 25, and insert -- (15) -- after the word "end" in line 24

Signed and Sealed this

Nineteenth Day of April, 2005

JON W. DUDAS
*Director of the United States Patent and Trademark Office*